United States Patent
Imai et al.

(10) Patent No.: US 6,631,542 B1
(45) Date of Patent: Oct. 14, 2003

(54) METHOD OF MANUFACTURING LAMINATED RING AND HEAT TREATMENT APPARATUS FOR USE IN SUCH METHOD

(75) Inventors: Hitoshi Imai, Sayama (JP); Hitoshi Karasawa, Sayama (JP); Katsuyuki Nakajima, Sayama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/580,920

(22) Filed: May 26, 2000

(30) Foreign Application Priority Data

| May 28, 1999 | (JP) | ............................................ 11/150667 |
| May 31, 1999 | (JP) | ............................................ 11/151924 |
| Nov. 12, 1999 | (JP) | ............................................ 11/321999 |
| Mar. 31, 2000 | (JP) | ............................................ 2000/097233 |

(51) Int. Cl.$^7$ .............................................. B23P 17/00
(52) U.S. Cl. .......................... 29/417; 148/228; 148/230
(58) Field of Search .............................. 29/417; 148/228, 148/226, 230, 231; 266/252, 266, 267, 247

(56) References Cited

U.S. PATENT DOCUMENTS

| 3,598,381 A | * | 8/1971 | Schwalm et al. .............. 266/97 |
| 3,857,553 A | * | 12/1974 | Griffiths ...................... 266/252 |
| 4,225,121 A | * | 9/1980 | Meyer et al. ................ 266/130 |
| 4,294,630 A | * | 10/1981 | Watanabe et al. ........... 148/220 |
| 4,395,025 A | * | 7/1983 | Watanabe et al. ........... 266/257 |
| 4,417,927 A | * | 11/1983 | Fullman ...................... 148/216 |
| 4,760,745 A | * | 8/1988 | Garshelis ................ 73/862.36 |
| 4,882,936 A | * | 11/1989 | Garshelis ................ 73/862.36 |
| 5,112,030 A | * | 5/1992 | Tahara et al. .............. 266/256 |
| 5,143,558 A | * | 9/1992 | Smith .......................... 148/225 |
| 5,194,097 A | * | 3/1993 | Tahara et al. .............. 148/234 |
| 5,273,585 A | * | 12/1993 | Shoga et al. ................ 118/719 |
| 5,393,488 A | * | 2/1995 | Rhoads et al. ................. 420/95 |
| 5,402,994 A | * | 4/1995 | Egger .......................... 266/252 |
| 5,871,806 A | * | 2/1999 | Shoga et al. ..................... 427/8 |
| 5,928,604 A | * | 7/1999 | Keil et al. .................... 266/259 |
| 6,309,474 B1 | * | 10/2001 | Yagasaki ...................... 148/230 |
| 6,318,140 B1 | * | 11/2001 | Yamagishi et al. ........... 72/110 |
| 6,379,473 B1 | * | 4/2002 | Imai et al. ................... 148/231 |
| 6,467,148 B1 | * | 10/2002 | Suzuki et al. .................. 29/464 |
| 6,550,122 B1 | * | 4/2003 | Imai et al. ..................... 29/417 |

FOREIGN PATENT DOCUMENTS

| JP | 403193864 | * | 8/1991 | ............. C23C/8/26 |
| JP | 404000365 | * | 1/1992 | ............. C23C/8/34 |
| JP | 405005171 | * | 1/1993 | ............. C23C/8/06 |
| JP | 407041848 | * | 2/1995 | ........... C21D/1/773 |

* cited by examiner

Primary Examiner—Gregory Vidovich
Assistant Examiner—Essama Omgba
(74) Attorney, Agent, or Firm—Birch, Stewart, Kolasch & Birch, LLP (57) ABSTRACT

A cylindrical drum, which comprises a sheet of maraging steel with welded opposite ends, is severed into a plurality of rings of predetermined width, and the rings are rolled to a predetermined length, after which circumferential lengths of the rings are corrected. The rings are aged by placing the rings into an aging chamber, heating the aging chamber to a predetermined aging temperature, and keeping the rings at the predetermined aging temperature for a predetermined period of time. Thereafter, the rings are nitrided by transferring the rings from the aging chamber into a nitriding chamber which is disposed independently of the aging chamber and has been heated to a predetermined nitriding temperature, while maintaining the rings at the aging temperature, keeping the rings at the nitriding temperature in an atmosphere containing at least an ammonia gas for a predetermined period of time, and cooling the rings. The rings are fitted and stacked together into a laminated ring for use as a belt in transmitting power in a continuously variable transmission.

10 Claims, 9 Drawing Sheets

METHOD OF MANUFACTURING LAMINATED RING AND HEAT TREATMENT APPARATUS FOR USE IN SUCH METHOD

BACKGROUND OF THE INVENTION

1. Field of the Invention

The present invention relates to a method of manufacturing a laminated ring for use as a belt in transmitting power in a continuously variable transmission, and a heat treatment apparatus for use in such a method.

2. Description of the Related Art

Continuously variable transmissions have a power transmitting belt trained around a pair of pulleys. The power transmitting belt comprises a laminated ring composed of a plurality of rings and mounted on and held by an element of predetermined shape.

The laminated ring is straight in shape when traveling between the pulleys, and curved in shape when running along the pulleys. The laminated ring undergoes severe bending deformations due to repetitive cycles of the straight and curved states. Therefore, the laminated ring is required to have a mechanical strength large enough to withstand the severe bending deformations.

One known material capable withstanding such severe bending deformations is maraging steel. The maraging steel is a low-carbon steel containing 17 to 19% of Ni, and Co, Mo, Ti, etc. When the maraging steel is heated to a suitable temperature after being subjected to a solution treatment, it causes age hardening in a martensitic state, resulting in an ultra-high strength steel that is highly strong and highly tough. The maraging steel is highly suitable for use as the material of the laminated ring.

The laminated ring has heretofore been manufactured according to the following process: The ends of a thin sheet of maraging steel that is an ultra-high strength steel are welded to each other, producing a cylindrical drum. The cylindrical drum is subjected to a first solution treatment in order to uniformize the hardness that has been partly increased due to the heat applied when the thin sheet of maraging steel was welded. Then, the cylindrical drum is severed into rings of certain width, which are rolled to a predetermined length. The rings are then subjected to a second solution treatment in order to recrystallize the rolled structure for restoring the metal crystal grain configuration that has been deformed by the rolling process. The rings that have been subjected to the second solution treatment are corrected into predetermined circumferential lengths, and aged and nitrided for increased hardness. The rings of slightly different circumferential lengths are fitted together into a laminated ring.

In the above process of manufacturing the laminated ring, the rings are aged to cause the maraging steel to develop aged hardness thereby to impart a high strength to the rings. Specifically, the rings are placed in an aging chamber, and the interior of the aging chamber is heated to a predetermined aging temperature, e.g., 480 to 520° C., and thereafter is held at the aging temperature for a predetermined period of time. The aging is performed in an inactive gas atmosphere such as nitrogen or the like in order to prevent an oxide layer from being formed on the a surface of the rings.

When the rings are aged, an intermetallic compound is separated out in the metal structure of the maraging steel, resulting in aged hardness for high strength and high toughness. The rings are then case-hardened because they need to have wear resistance and fatigue-resistant strength for use as the laminated ring.

The rings are case-hardened by nitriding the rings to form a nitride layer in their surface. The rings are nitrided by a gas nitriding process or a gas soft-nitriding process.

According to the gas nitriding process or the gas soft-nitriding process, nitrogen produced when ammonia is decomposed penetrates the metal structure of the maraging steel for thereby producing a nitride layer in the surface of the rings to harden the same for increased wear resistance and increased fatigue-resistant strength. If the rings are nitrided, then the rings are repeatedly heated to respective temperatures in the aging chamber and the nitriding chamber, kept at the temperatures for respective periods of time, and then cooled. Consequently, periods of time required for the aging and nitriding processes are increased, resulting in an increase in the manufacturing cost.

One solution to the above problem would be to successively age and nitride the rings in one processing chamber. Specifically, the rings are placed in the processing chamber, and the interior of the processing chamber is heated to an aging temperature and kept at the aging chamber for a predetermined period of time to age the rings. Thereafter, the interior of the processing chamber is not cooled, but the atmosphere in the processing chamber is replaced with an ammonia gas atmosphere or a mixed atmosphere of ammonia and RX gases, and the interior of the processing chamber is kept at a predetermined nitriding temperature for a predetermined period of time to effect gas nitriding or gas soft-nitriding on the rings. However, the above proposed process is disadvantageous in that the atmosphere changed for the nitriding process after the aging process tends to be not stabilized easily.

Another solution would be to simultaneously age and nitride the rings in one processing chamber. Specifically, the heating of the rings for the gas nitriding or gas soft-nitriding doubles as the heating of the rings for the aging. However, this process is problematic in that it is difficult to adjust the atmosphere in order to achieve an appropriate aging hardness and a nitride layer of a suitable depth.

It is known in the above process of manufacturing the laminated ring that the aging process causes the rings to shrink their volume thereof to reduce their circumferential lengths. It is also known that when the nitriding process is carried out, the volume of the rings is increased to increase their circumferential lengths because nitrogen penetrates the surface of the rings to form the nitride layer therein.

As a result, the rings which have been aged and nitrided suffer errors on the corrected circumferential lengths due to the reduction in the circumferential lengths in the aging process and the increase in the circumferential lengths in the nitriding process. In view of such errors, the rings are measured for their circumferential lengths after the aging process and the nitriding process, and classified according to the magnitude of errors of the measured circumferential lengths with respect to the corrected circumferential lengths.

Then, those of the classified rings which have such circumferential lengths that they can be fitted together are chosen and combined into a laminated ring. In order to allow easy selection of the classified rings which have such circumferential lengths that they can be fitted together, the errors of the circumferential lengths after the aging process and the nitriding process with respect to the corrected circumferential lengths should preferably be kept in the range of ±80 μm.

According to the conventional manufacturing process, however, the errors of the circumferential lengths of rings after they have been aged and nitrided with respect to the corrected circumferential lengths occasionally become unduly large. After such rings are classified, they are not used and are left to stand for a long period of time until they encounter rings whose circumferential lengths are suitable for being fitted together.

SUMMARY OF THE INVENTION

It is therefore an object of the present invention to provide a method of manufacturing a laminated ring by processing rings in reduced periods of time according to an aging process and a nitriding process, the nitriding process being carried out in a stable atmosphere.

Another object of the present invention is to provide a method of manufacturing a laminated ring of excellent dimensional stability by allowing easy selection of rings which have been aged and nitrided and whose circumferential lengths are suitable for being fitted together.

Still another object of the present invention is to provide a heat treatment apparatus that is suitable for use in such a method of manufacturing a laminated ring.

According to the present invention, there is provided a method of manufacturing a laminated ring for use as a belt in transmitting power in a continuously variable transmission, comprising the steps of severing a cylindrical drum, which comprises a sheet of maraging steel with welded opposite ends, into a plurality of rings of predetermined width, rolling the rings to a predetermined length, correcting circumferential lengths of the rings, aging the rings by placing the rings into an aging chamber, heating the aging chamber to a predetermined aging temperature, and keeping the rings at the predetermined aging temperature for a predetermined period of time, thereafter, nitriding the rings by transferring the rings from the aging chamber into a nitriding chamber which is disposed independently of the aging chamber and has been heated to a predetermined nitriding temperature, while maintaining the rings at the aging temperature, keeping the rings at the nitriding temperature in an atmosphere containing at least an ammonia gas for a predetermined period of time, and cooling the rings, and stacking the rings into a laminated ring.

In the above method, the rings which have been aged in the aging chamber are not cooled, but kept at the aging temperature and transferred into the nitriding chamber. Since the nitriding chamber has already been heated to the nitriding temperature, the rings transferred into the nitriding chamber are directly kept at the nitriding temperature for the predetermined period of time and nitrided in the atmosphere containing at least the ammonia gas.

Therefore, a process of cooling the rings after they have been aged and also a process of heating the rings to the nitriding temperature to nitride the rings, which have heretofore been employed, are omitted, and the total processing time is reduced. Furthermore, since the nitriding chamber is disposed independently of the aging chamber, it is not necessary to change atmospheres between the aging and nitriding processes, and the rings can be nitrided in the stable atmosphere.

The step of nitriding the rings may comprise the step of gas-nitriding the rings by keeping the rings at the nitriding temperature in an ammonia gas atmosphere for the predetermined period of time or gas-soft-nitriding the rings by keeping the rings at the nitriding temperature in a mixed atmosphere of ammonia and RX gases for the predetermined period of time. The ammonia gas atmosphere may contain other inactive gases than pure ammonia.

In order to perform the aging process and the nitriding process smoothly, the rings should preferably be nitrided at the nitriding temperature which is equal to or higher than the aging temperature.

The method may advantageously be carried out using a heat treatment apparatus in which the aging chamber is connected to the nitriding chamber through an operable and closable door. In the heat treatment apparatus, the rings are transferred from the aging chamber into the nitriding chamber through the operable and closable door.

Inasmuch as the aging chamber is separated from the nitriding chamber by the operable and closable door, the atmosphere containing at least the ammonia gas in the nitriding chamber, i.e., the ammonia gas atmosphere or the mixed atmosphere of ammonia and RX gases can be maintained in a stable state. When the aging of the rings in the aging chamber is finished, the door is opened to allow the rings to be quickly transferred from the aging chamber into the nitriding chamber.

The method may further advantageously be carried out using a heat treatment apparatus in which the aging chamber is connected through a first operable and closable door to an intermediate chamber which has been heated to a temperature equal to the aging temperature and the nitriding temperature or a temperature intermediate between the aging temperature and the nitriding temperature, and the intermediate chamber is connected to the nitriding chamber through a second operable and closable door. In the heat treatment apparatus, the rings are transferred from the aging chamber into the nitriding chamber successively through the first openable and closable door, the intermediate chamber, and the second openable and closable door.

If the nitriding temperature is the same as the aging temperature, then the temperature in the intermediate chamber is the same as the temperature in the aging chamber and the nitriding chamber, i.e., a gas-nitriding chamber or a gas-soft-nitriding chamber. If the nitriding temperature is higher than the aging temperature, then the temperature in the intermediate chamber is intermediate between the temperature in the aging chamber and the temperature in the nitriding chamber.

When the rings are transferred from the aging chamber into the nitriding chamber, the rings are temporarily placed in the intermediate chamber, and the effect of temperature differences on the rings upon the transfer is reduced.

When the aged rings are transferred from the aging chamber into the nitriding chamber, the intermediate chamber is effective to prevent the atmosphere in the aging chamber from flowing into the nitriding chamber, and hence prevent the atmosphere in the nitriding chamber from being unstabilized.

The rings after they have been nitrided may be cooled in the nitriding chamber or outside of the nitriding chamber. If the nitrided rings are to be cooled outside of the nitriding chamber, then the nitrided rings may be transferred into a cooling chamber which is connected to the nitriding chamber through an openable and closable door, and cooled in the cooling chamber.

The independent cooling chamber permits the atmosphere in the nitriding chamber to be stabilized. By quickly transferring the nitrided rings into the cooling chamber, the efficiency with which to transfer the rings is increased for contribution to automating the heat treatment apparatus.

In the heat treatment apparatus, the openable and closable door disposed between the aging chamber and the nitriding chamber, or between the aging chamber and the intermediate chamber, or between the intermediate chamber and the nitriding chamber, or between the nitriding chamber and the cooling chamber should preferably be vertically movable. The door which is vertically movable to be opened and closed is effective to prevent the atmospheres in the aging chamber and the nitriding chamber from becoming unstable.

When the rings are aged, they produce aged hardness for high mechanical strength. When the rings are nitrided after they have been aged, the aging may be accelerated due to the heating in the nitriding process, tending to reduce the mechanical strength which has been achieved. In the method according to the present invention, the rings are aged in a range in which aged hardness thereof is less than a maximum value, and the aged hardness of the rings reaches the maximum value when the rings are nitrided. In the description, the aging in the range in which aged hardness is less than a maximum value is referred to as "sub-aging", and the aging accelerated after the aged hardness has reached the maximum value thereby to reduce the mechanical strength is referred to as "excessive aging".

In the method according to the present invention, the rings are aged for sub-aging in the aging chamber, and the aged hardness of the rings is caused to reach the maximum value by the heat produced in the subsequent nitriding process, so that the aged hardness will have an appropriate level.

In order to sub-age the rings in the aging chamber, the rings are preferably aged in a temperature range from 480 to 500° C. for less than 60 minutes. If the aging temperature were less than 480° C., then the aged hardness would not reach the maximum value even when heated for 60 minutes, but in the sub-aged region, and a long period of time would be required to achieve the appropriate level of aged-hardness. If the aging temperature is 500° C., when the rings are aged for a period of time in excess of 60 minutes, the rings suffer excessive aging, and the aged hardness starts to decrease. If the aging temperature exceeded 500° C., then the rings would suffer excessive aging even when the rings are aged for a period of time less than 60 minutes.

In order to maximize the aged hardness in the nitriding process which follows the aging process, the rings are preferably nitrided in a temperature range from 480 to 520° C. at the nitriding temperature which is the same as or hither than the aging temperature for a period of time ranging from 45 to 60 minutes. In the nitriding process which follows the aging process, nitrogen penetrates the surface of each of the rings to form a nitride layer therein to produce hardness. Each of the nitrided rings develops such a hardness gradient that the hardness progressively decreases along the depth to which nitrogen goes into the ring from the surface thereof. Since the rings are used in a stacked state, each of the rings is required to have an appropriate hardness gradient from the surface of the ring into the ring for the resistance to fatigue due to relative slippage caused between the surfaces of the rings.

If the nitriding temperature were less than 480° C. and the rings were nitrided for less than 45 minutes, then the produced hardness gradient would not reach a required level of hardness. If the nitriding temperature were higher than 520° C. and the rings were nitrided for more than 60 minutes, then-the produced nitride layer would be deep and the internal hardness would be lowered.

The circumferential lengths of the rings are reduced by the aging process, and increased by the nitriding process. Therefore, the corrected circumferential lengths suffer errors. In the method according to the present invention, the rings are aged in a temperature range from 450 to 500° C. for a period of time ranging from 2 to 3 hours, and nitrided in a temperature range from 450 to 500° C. at the nitriding temperature which is the same as or higher than the aging temperature for a period of time ranging from 30 to 120 minutes, so that the errors of the circumferential lengths of the nitrided rings with respect to the corrected circumferential lengths of the rings fall within a predetermined error range, e.g., an error range of ±80 µm.

As described above, the rings whose circumferential lengths have been corrected are aged in a temperature range from 450 to 500° C. for a period of time ranging from 2 to 3 hours, and nitrided in a temperature range from 450 to 500° C. at the nitriding temperature which is the same as or higher than the aging temperature for a period of time ranging from 30 to 120 minutes. In this manner, the shrinkage of the rings in the aging process and the expansion of the rings in the nitriding process are balanced to reduce the errors of the circumferential lengths of the aged and nitrided rings with respect to the corrected circumferential lengths. Therefore, those rings that can be fitted together can easily be selected after the aging and nitriding processes.

If the rings were kept at 450° C. for less than 2 hours in the aging process, then no sufficient aged hardness would be achieved, and the expansion of the rings in the nitriding process would exceed the shrinkage of the rings in the aging process, increasing the errors of the circumferential lengths of the aged and nitrided rings with respect to the corrected circumferential lengths in a manner to increase the circumferential lengths. If the rings were kept at 500° C. for more than 3 hours in the aging process, then the shrinkage of the rings in the aging process would exceed the expansion of the rings in the nitriding process, increasing the errors of the circumferential lengths of the aged and nitrided rings with respect to the corrected circumferential lengths in a manner to reduce the circumferential lengths.

In the nitriding process that follows the aging process, if the rings were kept at 450° C. for less than 30 minutes, then no sufficient nitriding would be achieved, and the shrinkage of the rings in the aging process would exceed the expansion of the rings in the nitriding process, increasing the errors of the circumferential lengths of the aged and nitrided rings with respect to the corrected circumferential lengths in a manner to reduce the circumferential lengths. If the rings were kept at 500° C. for more than 120 minutes, then the expansion of the rings in the nitriding process would exceed the shrinkage of the rings in the aging process, increasing the errors of the circumferential lengths of the aged and nitrided rings with respect to the corrected circumferential lengths in a manner to increase the circumferential lengths.

Because the errors of the circumferential lengths of the nitrided rings with respect to the corrected circumferential lengths of the rings fall within the error range of ±80 µm, those rings that can be fitted together can easily be selected. If the errors were greater than the error range of ±80 µm, then those aged and nitrided rings which can be fitted together based on the classifications according to the measured circumferential lengths are not available, and the period of time in which the existing rings are left in stock is increased.

In order to keep the errors of the circumferential lengths of the nitrided rings with respect to the corrected circumferential lengths of the rings reliably within the error range, the rings are preferably nitrided such that the thickness of a nitride layer in the surface of each of the rings is in a range from 20 to 40% of the overall thickness of the ring. If the thickness of the nitride layer in the surface of each of the rings were smaller than 20% the overall thickness of the ring, then no sufficient hardness would be reached by the nitriding process, and the shrinkage of the rings in the aging process would exceed the expansion of the rings in the nitriding process, increasing the errors of the circumferential lengths of the aged and nitrided rings with respect to the corrected circumferential lengths in a manner to reduce the circumferential lengths. If the thickness of the nitride layer in the surface of each of the rings were greater than 40% the overall thickness of the ring, then the expansion of the rings in the nitriding process would exceed the shrinkage of the rings in the aging process, increasing the errors of the circumferential lengths of the aged and nitrided rings with respect to the corrected circumferential lengths in a manner to increase the circumferential lengths.

The above and other objects, features, and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
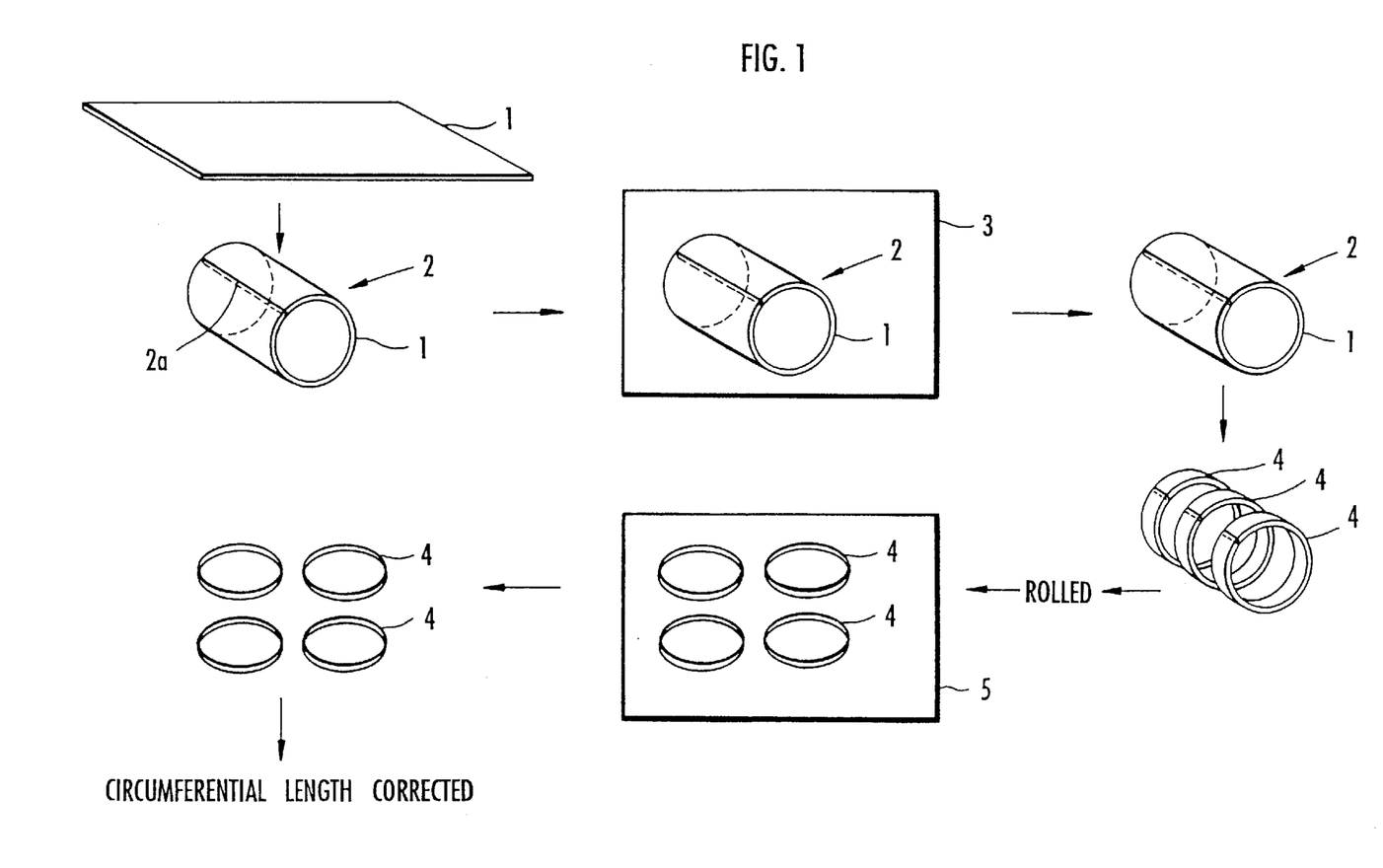
FIG. 1 is a schematic view showing successive steps of a method of manufacturing a laminated ring according to the present invention.

In a method of manufacturing a laminated ring according to the present invention, as shown in FIG. 1, a thin sheet 1 of maraging steel is bent into a loop, whose opposite ends are welded to each other to produce a cylindrical drum 2. Since the maraging Steel exhibits aged hardness due to the heat applied when the thin sheet 1 of maraging steel was welded, the cylindrical drum 2 has regions of increased hardness on opposite sides of a welded seam 2a thereof. Therefore, the cylindrical drum 2 suffers hardness irregularities.

To eliminate such hardness irregularities, the cylindrical drum 2 is placed in a vacuum-furnace 3 and kept at a temperature in the range from 820 to 830° C. for a period of time raging from 20 to 60 minutes in a first solution treatment process. The first solution treatment process thus carried out uniformizes the hardness of the cylindrical drum 2 and removes welding strains therefrom. After the first solution treatment process, the cylindrical drum 2 is removed from the vacuum furnace 3, and severed into rings 4 of certain width.

The rings 4 have their edges burred due to the severance. The burred edges are beveled off by a barrel grinding process. Thereafter, the rings 4 are rolled by a rolling reduction ranging from 40 to 50%. The rolled rings 4 are placed in a heating furnace 5 in which they are subject to a second solution treatment process. In the second solution treatment process, the rings 4 are kept at a temperature ranging from 760 to 850° C., e.g., 820° C., for 30 minutes in a reducing atmosphere of nitrogen containing 1–10%, e.g., 4%, of hydrogen, to restore the metal crystal grain configuration that has been deformed by the rolling process to the configuration prior to the rolling process..

After the second solution treatment process, the rings 4 are removed from the heating furnace 5, and corrected for their circumferential lengths. The rings 4 with their circumferential lengths corrected are then placed in a heat treatment apparatus 6 shown in FIG. 2(a) for an aging process and a nitriding process. The heat treatment apparatus 6 comprises a linear array of an aging chamber 7, a nitriding chamber 8, and an intermediate chamber 9 disposed between the aging chamber 7 and the nitriding chamber 8. The aging chamber 7 and the nitriding chamber 8 are connected to each other through vertically openable and closable doors 10, 11 that are positioned between themselves and the intermediate chamber 9. The aging chamber 7 has a vertically openable and closable inlet port 12 positioned remotely from the intermediate chamber 9. The nitriding chamber 8 has a vertically openable and closable outlet port 13 positioned remotely from the intermediate chamber 9.

The heat treatment apparatus 6 shown in FIG. 2(a) operates as follows: A ring 4 is introduced via the inlet port 12 into the aging chamber 7. When the ring 4 is introduced into the aging chamber 7, the aging chamber 7 is heated by a heating means (not shown) to a predetermined aging temperature, and keeps the ring 4 at the predetermined aging temperature for a predetermined period of time, thereby aging the ring 4. The ring 4 is aged in a nitrogen atmosphere that has been introduced into the aging chamber 7 by an introducing means (not shown), so that an oxide layer is prevented from being formed on the surface of the ring 4 for the benefit of the subsequent nitriding process.

After the aging process, the door 10 is opened and the ring 4 is transferred from the aging chamber 7 into the intermediate chamber 9. Then, the door 10 is closed and the door 11 is opened, and the ring 4 is transferred from the intermediate chamber 9 into the nitriding chamber 8.

By this time, an atmosphere containing at least an ammonia gas has been introduced into the nitriding chamber 8 by an introducing means (not shown), and the nitriding chamber 8 has been heated to a temperature equal to or higher than-the aging temperature in the aging chamber 7. The intermediate chamber 9 has been heated to a temperature equal to the aging temperature in the aging chamber 7 or a temperature intermediate between the aging temperature in the aging chamber 7 and the temperature in the nitriding chamber 8 which is higher than the aging temperature in the aging chamber 7. The atmosphere introduced into the nitriding chamber 8 is either an ammonia gas atmosphere or a mixed gas atmosphere of ammonia and RX gases.

In the present embodiment, since the ring 4 is transferred from the aging chamber 7 via the intermediate chamber 9 into the nitriding chamber 8, the effect of temperature differences on the ring 4 upon the transfer is reduced. Since the doors 10, 11 are vertically movable, the atmospheres in the aging chamber 7 and the nitriding chamber 8 can stably be maintained without being disturbed.

Then, the ring 4 is nitrided in the nitriding chamber 8 which has been heated to a temperature equal to or higher than the aging temperature in the aging chamber 7, by being kept in the ammonia gas atmosphere or the mixed gas atmosphere of ammonia and RX gases, for a predetermined period of time. After the nitriding process, the ring 4 is cooled in the nitriding chamber 8, and unloaded therefrom via the outlet port 13.

Figure 2:
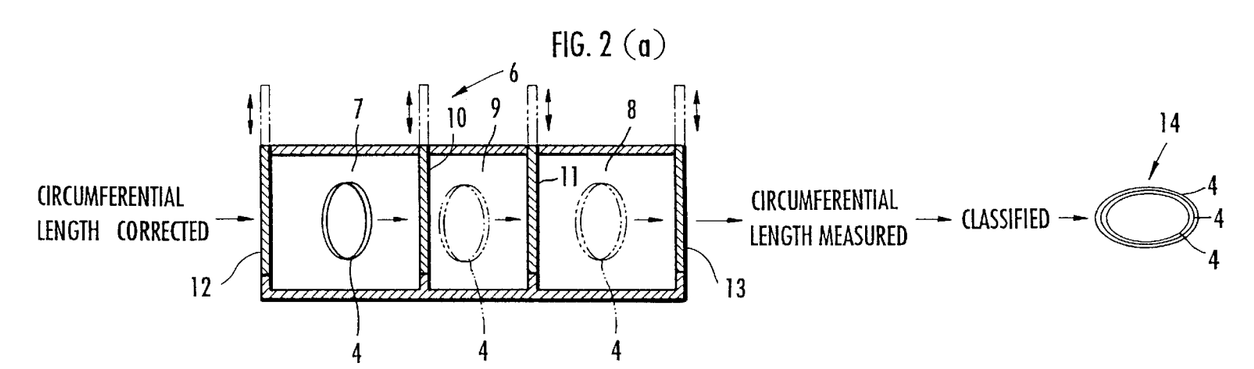
FIGS. 2(a) and 2(b) are schematic views showing successive steps of the method of manufacturing a laminated ring according to the present invention.

As shown in FIG. 2(b), the heat treatment apparatus 6 may additionally have a cooling chamber 15 disposed adjacent to the nitriding chamber 8 remotely from the intermediate chamber 9. The cooling chamber 15 is connected to the nitriding chamber 8 through a vertically openable and closable door 13, and has a vertically openable and closable outlet port 16 positioned remotely from the nitriding chamber 8.

In the heat treatment apparatus 6 shown in FIG. 2(b), after the ring 4 is aged in the aging chamber 7 and nitrided in the nitriding chamber 8 in the same manner as with the heat treatment apparatus 6 shown in FIG. 2(a), the ring 4 is transferred through the door 13 into the cooling chamber 15 and then cooled in the cooling chamber 15.

Then, the ring 4 is measured for its circumferential length as shown in FIGS. 2(a) and 2(b), and thereafter classified according to the magnitude of an error of the measured circumferential length with respect to the corrected circumferential length. A number of rings 4 are thus classified, and those rings 4 that can be fitted to gether are selected form the classified rings 4. In this manner, a plurality of rings 4 whose circumferential lengths differ slightly from each other are fitted and stacked together into a laminated ring, 14.

In each of FIGS. 2(a) and 2(b), three rings 4 are shown as being fitted together into a laminated ring 14, by way of example. However, the number of rings 4 that are fitted together into a laminated ring 14 may be smaller or greater than three.

Figure 3:
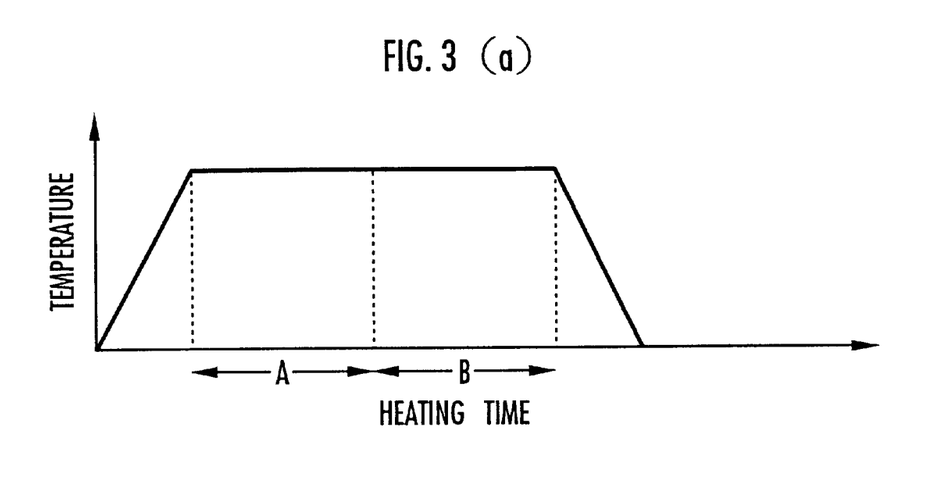
FIGS. 3(a) and 3(b) are graphs showing heating patterns of an aging process and a nitriding process.

FIG. 3(a) shows a heating pattern in the heat treatment apparatus 6 when the intermediate chamber 9 and the nitriding chamber 8 have been heated to the same temperature as the aging temperature in the aging chamber 7. FIG. 3(b) shows, for comparison, a heating pattern with conventional aging and nitriding chambers that are independent of each other.

According to the heating pattern shown in FIG. 3(a) in the heat treatment apparatus 6, the aging process A is followed by the nitriding process B at the aging temperature without the ring 4 being cooled between those processes A, B. According to the heating pattern shown in FIG. 3(b) with the conventional aging and nitriding chambers, a time C is required to cool the ring in the aging chamber after the aging process A, and a time D is required to heat the ring to the nitriding temperature in the nitriding chamber. It can be seen from FIGS. 3(a) and 3(b) that the heat treatment apparatus 6 can dispense with a time (C+D) corresponding to the sum of the times C, D.

With the conventional heating pattern shown in FIG. 3(b), when a temperature setting for the nitriding chamber increases, the actual atmosphere temperature (indicated by the imaginary line in FIG. 3(b)) in the nitriding chamber increases with a delay. Therefore, it takes a certain time until the atmosphere temperature in the nitriding chamber becomes uniform. Consequently, the nitriding process tends to be not uniform on the ring with the conventional heating pattern shown in FIG. 3(b). According to the heating pattern of the present embodiment shown in FIG. 3(a), however, the nitriding process can be carried out uniformly because the nitriding chamber 8 has already been heated to the same temperature as the aging temperature in the aging chamber 7 to uniformize the atmosphere temperature in the nitriding chamber 8.

According to a first mode of the present embodiment, in order to age the ring 4 for sub-aging in the aging process and additionally heat the ring 4 in the nitriding process following the aging process to maximize aged hardness of the ring 4, the aging process A is carried out in a temperature range from 480 to 500° C. for less than 60 minutes, and the nitriding process B is carried out in a temperature range from 480 to 520° C. at a nitriding temperature which is the same as or higher than the aging temperature for a period of time ranging from 45 to 60 minutes.

Figure 4:
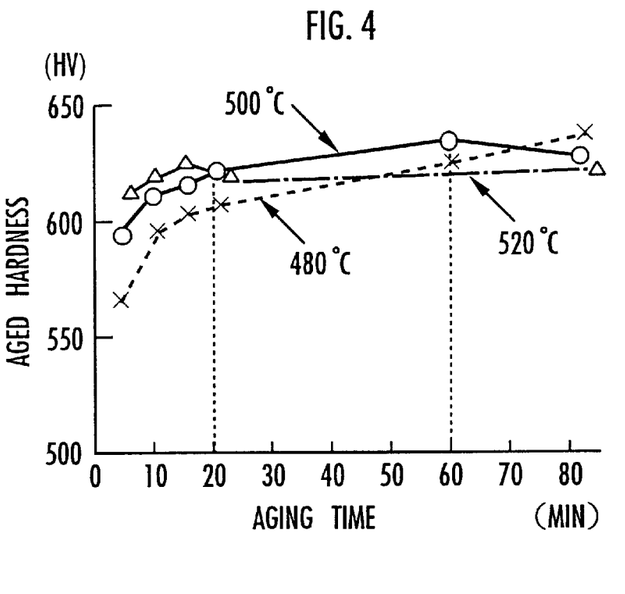
FIG. 4 is a graph showing the relationship between the heating time and the aged hardness in the aging process.

The relationship between the heating time in the aging process A and the aged hardness will be described below with reference to FIG. 4. It can be seen from FIG. 4 that if the aging-temperature is 480° C., then the aged hardness does not reach a maximum value even when the ring is heated for 60 minutes, and hence the ring is in a sub-aged region. If the aging temperature is 500° C., then the aged hardness reaches a maximum value when the ring is heated for 60 minutes, and the ring is excessively aged and the aged hardness starts to decrease when the ring is heated for more than 60 minutes. If the aging temperature is 520° C., then the ring is excessively aged and the aged hardness starts to decrease when the heating time exceeds 20 minutes.

In this embodiment, in order to prevent the aged hardness from being lowered due to excessive aging, the heating time in the aging process A is kept in the sub-aged region, and the aged hardness is caused to reach a maximum value by the heating in the nitriding process B that follows the aging process A. Therefore, if the aging temperature is 500° C., then heating time in the aging process A can be less than 60 minutes.

The nitriding process B is carried out in a temperature range from 480 to 520° C. at a nitriding temperature which is the same as or higher than the aging temperature for a period of time ranging from 45 to 60 minutes. Therefore, the aging of the ring is further performed in addition to the sub-aging in the aging process A until the aged hardness is maximized.

The relationship between the nitriding temperature and the heating time will be described below. According to the nitriding process, nitrogen penetrates the surface of the ring 4 to form a nitride layer therein to produce hardness. The nitrided ring 4 develops such a hardness gradient that the hardness progressively decreases along the depth to which nitrogen goes into the ring 4 from the surface thereof.

The rings 4 as the laminated ring are used as a belt in transmitting power in a continuously variable transmission. When the continuously variable transmission undergoes engine braking, the surfaces of the rings 4 suffer a relative slippage. The ring 4 is required to have a large surface hardness for the resistance to fatigue due to A the slippage, and should desirably have an appropriate hardness gradient from the surface of the ring 4 into the ring 4.

Table given below shows hardness gradients produced when the ring 4 that has been subjected to the aging process A in the sub-aging region is nitrided in the nitriding process B as shown in FIG. 3(a). The hardness gradients in Table include a hardness gradient aa optimum for a belt in transmitting power in a continuously variable transmission, a hardness gradient bb applicable to a belt in transmitting power in a continuously variable transmission, an inadequate hardness gradient cc which is too gradual, and an inadequate hardness gradient dd which is too steep.

TABLE

|  |  | Nitriding temperature (° C.) | | | | |
| --- | --- | --- | --- | --- | --- | --- |
|  |  | 460 | 480 | 500 | 520 | 540 |
| Heating | 30 | cc | cc | bb | bb | dd |
| time | 45 | cc | bb | aa | aa | dd |
| (min.) | 60 | cc | aa | aa | bb | dd |
|  | 75 | bb | bb | dd | dd | dd |

It can be understood from Table above that when the ring 4 that has been subjected to the aging process A in the sub-aging region is nitrided in the nitriding process B, it is possible to obtain a hardness gradient optimum for a continuously variable transmission belt if the nitriding temperature is in the range from 480 to 520° C. and the heating time is in the range from 45 to 60 minutes.

Figure 5:
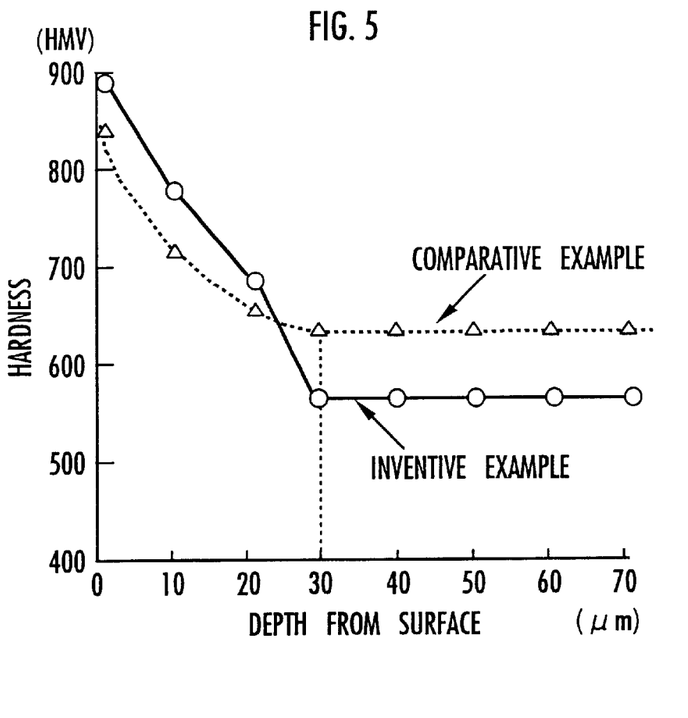
FIG. 5 is a graph showing the relationship between the depth from the surface of a ring produced by the method according to the present invention and the hardness.

FIG. 5 shows the relationship (hardness gradient) between the depth from the surface of the ring 4 and the hardness when the ring 4 is subjected to the aging process A in the sub-aging region at 500° C. for 40 minutes and then nitrided in the gas soft-nitriding process B at 500° C. for 50 minutes according to the heating pattern shown in FIG. 3(a). FIG. 5 also shows, for comparison, a hardness gradient achieved when the ring 4 is subjected to the aging process A to obtain peak aged hardness at 500° C. for 60 minutes and then nitrided in the gas soft-nitriding process B at 500° C. for 50 minutes according to the heating pattern shown in FIG. 3(a).

A review of FIG. 5 clearly indicates that the surface hardness (indicated by the solid-line curve) of the ring 4 produced by the method according to the embodiment is greater than the surface hardness (indicated by the broken-line curve) of the ring produced by the comparative example, producing a hardness gradient more suitable than with the comparative example in a range from the surface of the ring 4 to the depth of 30 $\mu$m.

According to a second mode of the present embodiment, in order to reduce the error of the circumferential length of the ring 4 that has been subjected to the aging process A and the nitriding process B with respect to the corrected circumferential length of the ring 4 to allow easy selection of rings 4 that can be fitted together, the aging process A is carried out in a temperature range from 450 to 500° C. for a period of time ranging from 2 to 3 hours, and the nitriding process B is carried out in a temperature range from 450 to 500° C. at a nitriding temperature which is the same as or higher than the aging temperature for a period of time ranging from 30 to 120 minutes.

Figure 6:
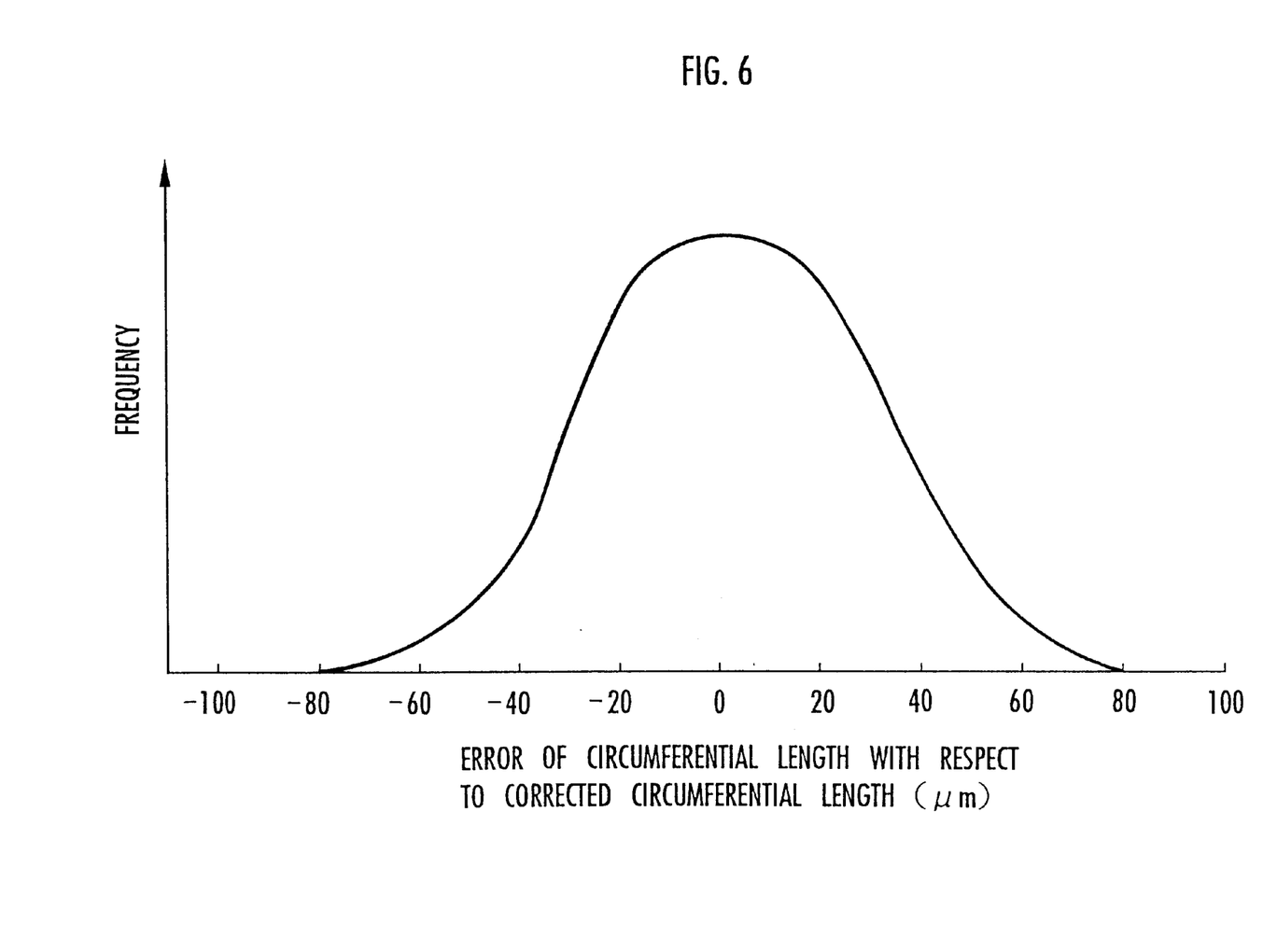
FIG. 6 is a graph showing a frequency distribution of errors of the circumferential lengths of rings produced by the method according to the present invention with respect to corrected circumferential lengths.

FIG. 6 shows a frequency distribution of errors of the measured circumferential lengths of the rings 4 subjected to the aging process A and the nitriding process B with respect to the corrected circumferential lengths. It can be understood from FIG. 6 that the errors of the rings 4 produced in the second mode of the embodiment fall within the range of ±80 $\mu$m. Therefore, rings 4 of such circumferential lengths that can be fitted together can easily be selected from the classified rings 4 which have been produced according to the present embodiment, and hence the period of time in which the rings 4 are left in stock can be shortened.

In order to further reduce the errors of the measured circumferential lengths of the rings 4 subjected to the aging process A and the nitriding process B with respect to the corrected circumferential lengths, it is preferable to control the ratio of the thickness of the nitride layer to the overall thickness of the ring 4.

Figure 7:
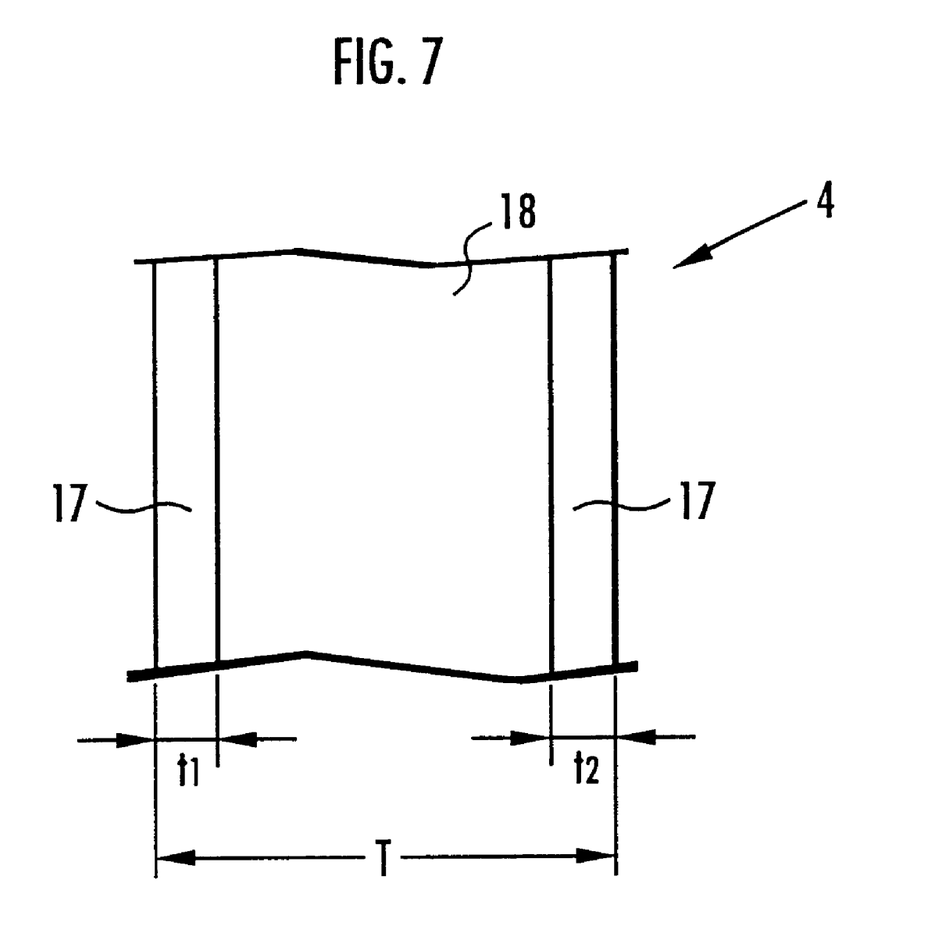
FIG. 7 is a schematic cross-sectional view of a ring produced by the method according to the present invention.

As shown in FIG. 7, the ring 4 which has been subjected to the aging process A and the nitriding process B has nitride layers 17 in its opposite surfaces and an aged layer 18 between the nitride layers 17. If the nitride layers 17 have respective thicknesses $t_1$, $t_2$ and the ring 4 has a overall thickness T, then the ratio A (%) of the thickness of the nitride layers 17 to the overall thickness T of the ring 4 is represented by the following equation:

$$A=(t_1+t_2)/T \times 100$$

By processing the ring 4 under the conditions of the second mode, the ring 4 is nitrided to keep the ratio A within the range from 20 to 40%.

Figure 8:
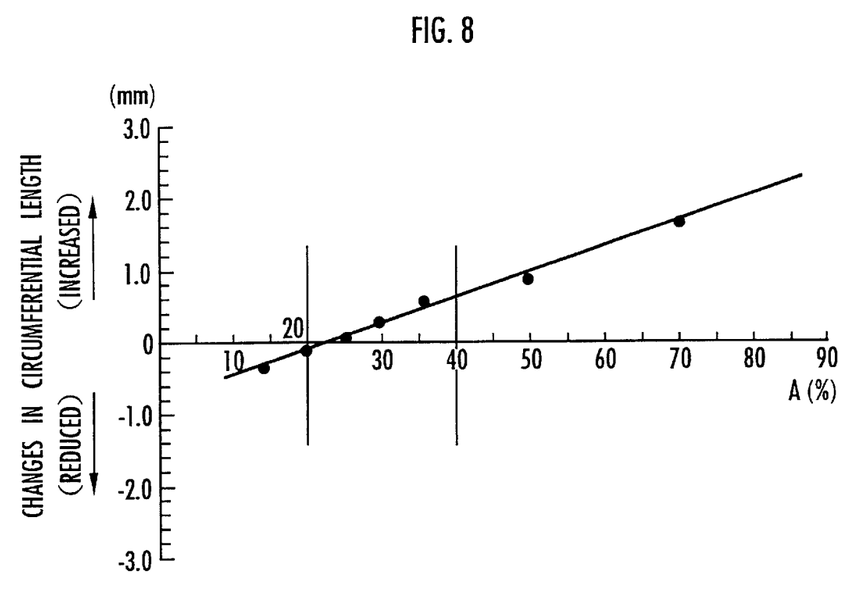
FIG. 8 is a graph showing the relationship between the ratio of the thickness of nitride layers to the overall thickness of a ring and changes in the circumferential lengths.

FIG. 8 shows the relationship between the ratio A (%) of the thickness of the nitride layers 17 to the overall thickness T of the ring 4 and the circumferential length of the ring 4. A study of FIG. 8 reveals that when the ratio A is 20%, the circumferential length of the ring 4 is shortened only by 0.1 mm, and when the ratio A is 40%, the circumferential length of the ring 4 is increased only by 0.6 mm. Consequently, it can be seen from FIG. 8 that since the ratio A is in the range from 20 to 40%, the nitrided rings 4 according to the present embodiment suffer very small circumferential length variations and hence are highly dimensionally stable.

Figure 9:
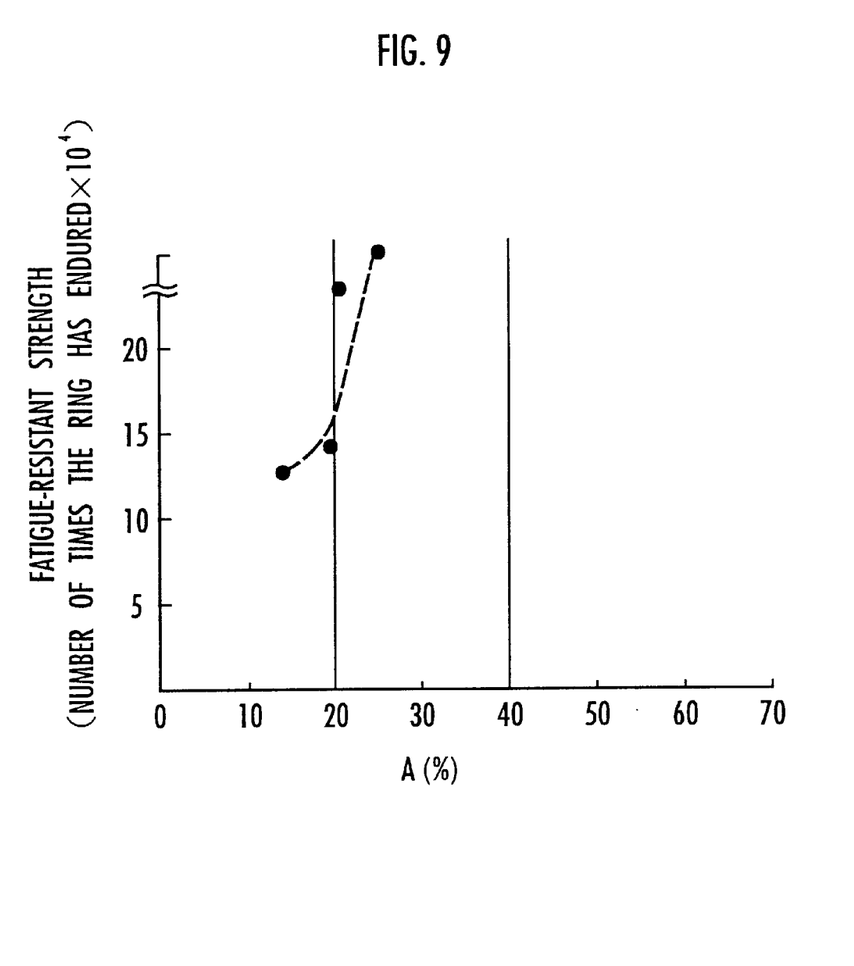
FIG. 9 is a graph showing the relationship between the ratio of the thickness of a nitride layer to the overall thickness of a ring and the fatigue-resistant strength of the ring.

FIG. 9 shows the relationship between the ratio A (%) of the thickness of the nitride layers 17 to the overall thickness T of the ring 4 and the fatigue-resistant strength of the ring 4. In FIG. 9, the ring 4 is used in a laminated ring as a continuously variable transmission belt, and the fatigue-resistant strength is shown as an indication of the number of times the ring 4 has endured until it is broken.

It can be seen from FIG. 9 that the number of times the nitrided ring 4 according to the present embodiment has endured until it is broken is about $4 \times 10^4$ or more regardless of the value of the ratio A (%), and hence the nitrided ring 4 has a sufficient level of fatigue-resistant strength. FIG. 9 also indicates that if the ratio A (%) exceeds 20%, then the number of times the nitrided ring 4 has endured until it is broken sharply increases, resulting in an large increase in the fatigue-resistant strength.

Figure 10:
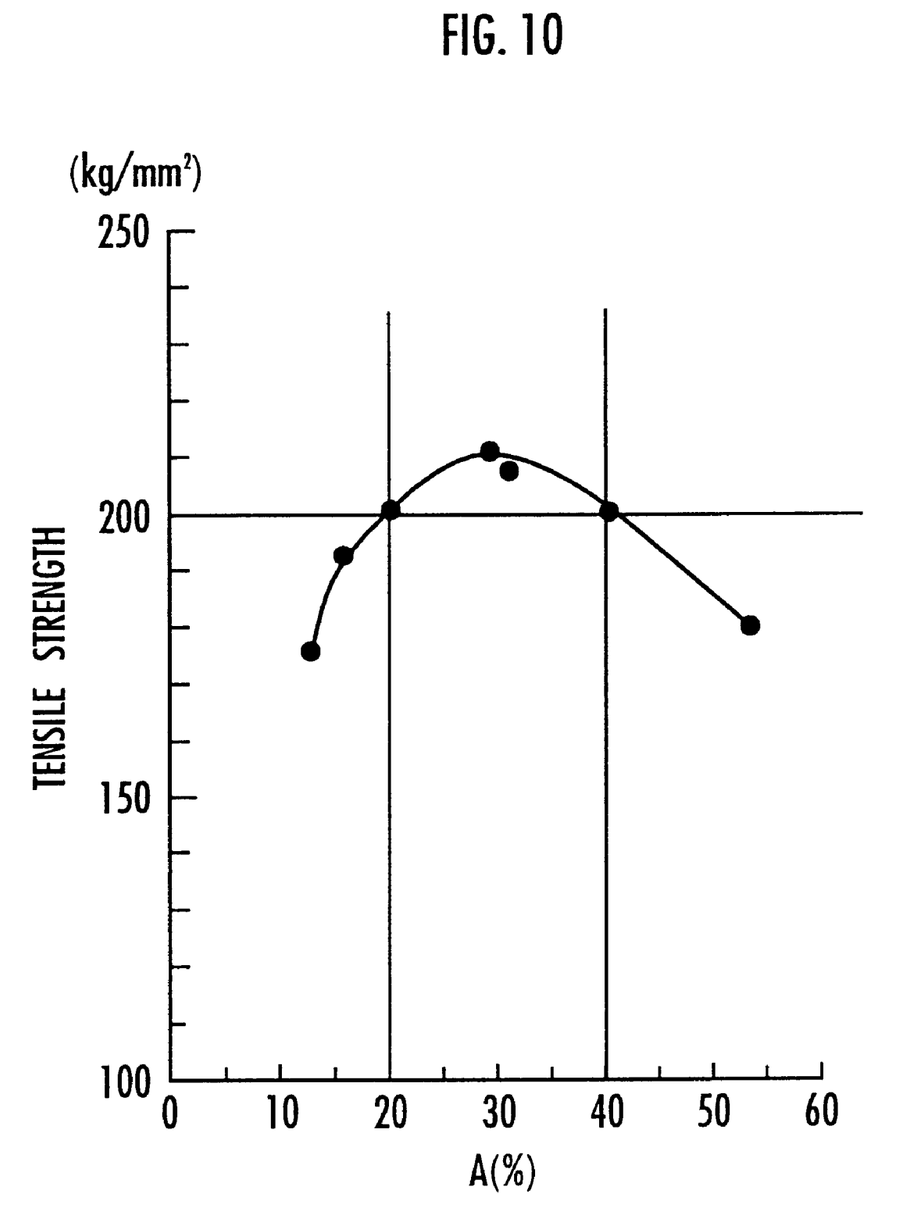
FIG. 10 is a graph showing the relationship between the ratio of the thickness of a nitride layer to the overall thickness of a ring and the tensile strength of the ring.

FIG. 10 shows the relationship between the ratio A (%) of the thickness of the nitride layers 17 to the overall thickness T of the ring 4 and the tensile strength of the ring 4. Since the ring 4 is used as in a laminated ring as a continuously variable transmission belt, the tensile strength achieved by the aged layer 18 is required to be 200 kgf/mm$^2$ or more. When the aging is not sufficient, the tensile strength cannot be achieved. Even when the aging is sufficient, if the ratio A (%) is excessive, relatively reducing the proportion of the aged layer 18, then the tensile strength cannot be achieved either.

According to the present embodiment, since the ratio A (%) of the thickness of the nitride layers 17 to the overall thickness T of the ring 4 is in the range from 20 to 40% because the ring 4 is nitrided, the tensile strength is 200 kgf/mm$^2$ or more, as shown in FIG. 10.

With the ratio A (%) being in the range from 20 to 40%, when the ring 4 is used in a laminated ring as a continuously variable transmission belt, the ring 4 can satisfy requirements for both the fatigue-resistant strength and the tensile strength.

Although certain preferred embodiments of the present invention have been shown and described in detail, it should be understood that various changes and modifications may be made therein without departing from the scope of the appended claims.

What is claimed is:

1. A method of manufacturing a laminated ring for use as a belt in transmitting power in a continuously variable transmission, comprising the steps of:

severing a cylindrical drum, which comprises a sheet of maraging steel with welded opposite ends, into a plurality of rings of predetermined width, the maraging steel being a low-carbon steel containing from 17–19% of Ni, and Co, Mo, and Ti;

correcting circumferential lengths of the rings;

aging the rings by placing the rings into an aging chamber, heating the aging chamber to a predetermined aging temperature, and keeping the rings at said predetermined aging temperature for a predetermined period of time;

thereafter, nitriding said rings by transferring the rings from said aging chamber into a nitriding chamber which is disposed independently of said aging chamber and has been heated to a predetermined nitriding temperature, while maintaining said rings at said aging temperature, keeping said rings at said nitriding temperature in an atmosphere containing at least an ammonia gas for a predetermined period for time, and cooling said rings; and stacking the rings into a laminated ring, wherein said rings are aged in a temperature range of from 480–500° C. for less than 60 minutes so that hardness of the rings is less than a maximum value, and nitrided in a temperature range of from 480–500° C. at the nitriding temperature which is the same as or higher than said aging temperature for a period of time ranging from 45–60 minutes so that the aged hardness of the rings reaches the maximum value.

2. A method according to claim 1, wherein said step of nitriding said rings comprises the step of gas-nitriding the rings by keeping said rings at said nitriding temperature in an ammonia gas atmosphere for said predetermined period of time or gas-soft-nitriding the ring by keeping said rings at said nitriding temperature in a mixed atmosphere of ammonia and RX gases for said predetermined period of time.

3. A method according to claim 1, wherein said aging chamber is connected to said nitriding chamber through an openable and closable door, and wherein said rings are transferred from said aging chamber into said nitriding chamber through said openable and closable door.

4. A method according to claim 1, wherein said aging chamber is connected through a first openable and closable door to an intermediate chamber which has been heated to a temperature equal to said aging temperature and said nitriding temperature or a temperature intermediate between said aging temperature and said nitriding temperature and said intermediate chamber is connected to said nitriding chamber through a second openable and closable door, and wherein said rings are transferred from said aging chamber into said nitriding chamber successively through said first openable and closable door, said intermediate chamber, and said second openable and closable door.

5. A method according to claim 1, wherein the nitrided rings are cooled in said nitriding chamber.

6. A method according to claim 1, wherein the nitrided rings are transferred into a cooling chamber which is connected to said nitriding chamber through an openable and closable door, and cooled in said cooling chamber.

7. A method of manufacturing a laminated ring for use as a belt in transmitting power in a continuously variable transmission, comprising the steps of:

severing a cylindrical drum, which comprises a sheet of maraging steel with welded opposite ends, into a plurality of rings of predetermined width, the maraging steel being a low-carbon steel containing 17 to 19% of Ni, and Co, Mo, and Ti;

correcting circumferential lengths of the rings;

aging the rings by placing the rings into an aging chamber, heating the aging chamber to a predetermined aging temperature, and keeping the rings at said predetermined aging temperature for a predetermined period of time;

thereafter, nitriding said rings by transferring the rings from said aging chamber into a nitriding chamber which is disposed independently of: said aging chamber and has been heated to a predetermined nitriding temperature, while maintaining said rings at said aging temperature, keeping said rings at said nitriding temperature in an atmosphere containing at least an ammonia gas for a predetermined period for time, and cooling said rings; and stacking the rings into a laminated ring, wherein said rings are aged in a temperature range of from 450° C. to 500° C. for a period of time ranging from 2 to 3 hours, and nitrided in, a temperature range of from 450° C. to 500° C. at the nitriding temperature which is the same as or higher than said aging temperature for a period of time ranging from 30 to 120 minutes, so that errors of circumferential lengths of the nitrided rings with respect to the corrected circumferential lengths of the rings fall within a predetermined error range.

8. A method according to claim 7, wherein said rings are aged such that an error of the circumferential length of each of the nitrided rings with respect to the corrected circumferential length thereof is in an error range of ±80 μm.

9. A method according to claim 7, wherein said rings are nitrided such that the thickness of a nitride layer in the surface of each of the rings is in a range from 20 to 40% of the overall thickness of the ring.

10. A method according to claim 9, wherein said rings are nitrided such that a tensile strength achieved by an aged layer of each of the rings is 200 kgf/mm$^2$ or more.

* * * * *